March 5, 1929.  M. A. COVER  1,704,312
VEHICLE STEERING MECHANISM
Filed March 8, 1927   2 Sheets-Sheet 1
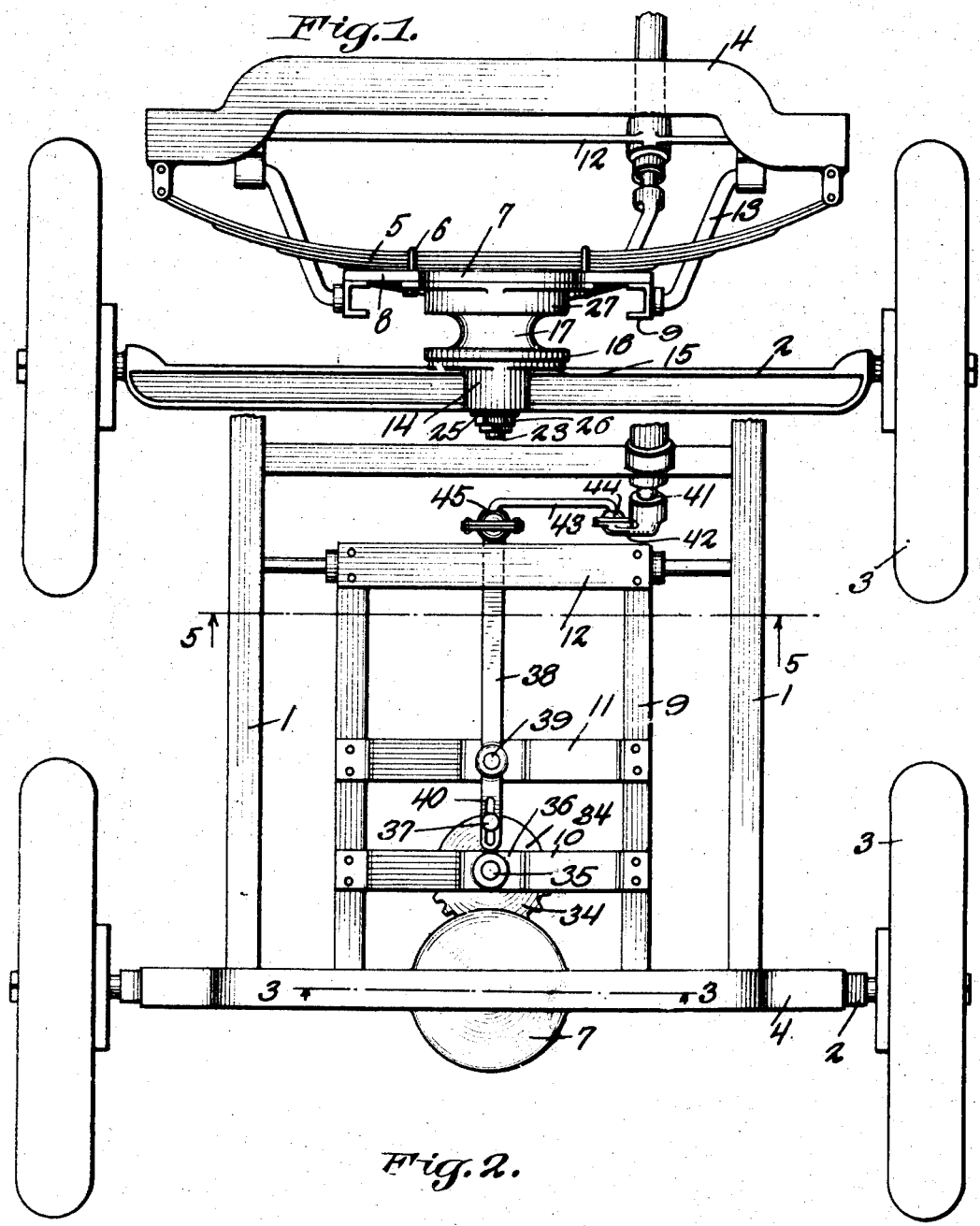
Monroe A. Cover, Inventor

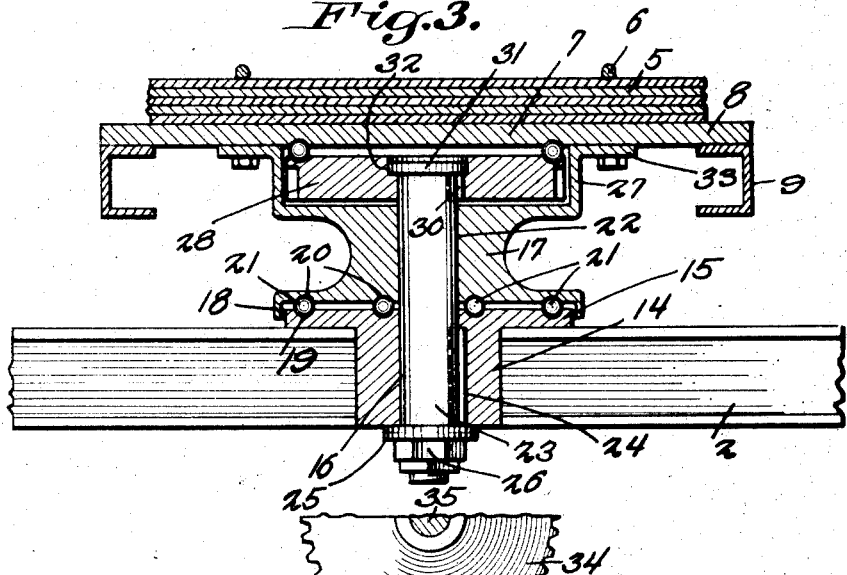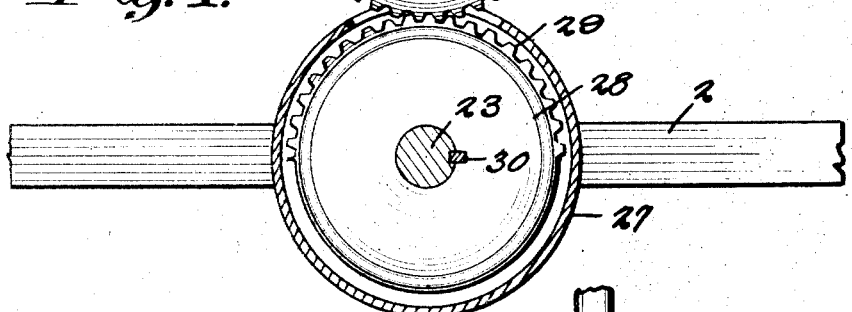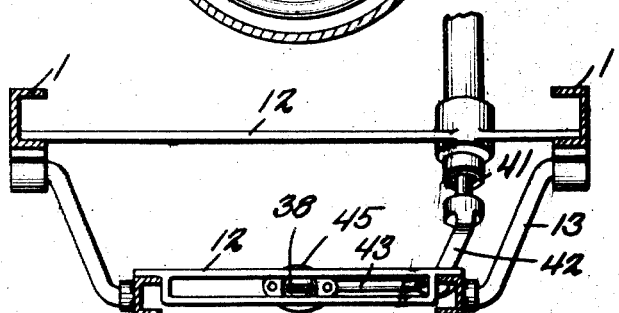

Patented Mar. 5, 1929.

1,704,312

UNITED STATES PATENT OFFICE.

MONROE A. COVER, OF OKMULGEE, OKLAHOMA.

VEHICLE STEERING MECHANISM.

Application filed March 8, 1927. Serial No. 173,748.

This invention relates to improvements in steering gear for automobiles and has as its general object to provide a steering gear construction which will present advantages over the ordinary types of steering gears now in use.

It is a well known fact that the ordinary types of steering gear are so constructed that the angular adjustment of the front wheels, through the operation of the gear, is limited and as a consequence difficulty is often experienced in backing into a restricted parking space as well as in leaving such a place. Likewise difficulty is experienced in reversing the automobile or making a complete turn, to travel in an opposite direction, on narrow country roads or in blind alleys, similar trouble being experienced in making short turns in garages and in other places where a number of automobiles may be parked in close proximity to one another. Therefore the present invention contemplates the provision of a steering mechanism which will overcome this disadvantage possessed by steering gears of the present standard types, and the object of the invention is to provide a steering mechanism so constructed that turns substantially as short as right angular turns may be made.

Another object of the invention is to provide a steering mechanism which will present the advantage above referred to and which will be equally as safe as steering mechanisms of the standard types.

In the accompanying drawings Fig. 1 is a view in front elevation of the steering mechanism embodying the invention;

Fig. 2 is a top plan view thereof;

Fig. 3 is a vertical transverse sectional view taken substantially on the line 3—3 of Fig. 2 looking in the direction indicated by the arrows;

Fig. 4 is a plan view illustrating a portion of the mechanism, parts being shown in section; and, Fig. 5 is a vertical transverse sectional view taken substantially on the line 5—5 of Fig. 2, looking in the direction indicated by the arrows.

In the drawings the numeral 1 indicates the side bars of the chassis frame of the automobile in connection with which the steering mechanism embodying the invention is installed, and the numeral 2 indicates the front axle of the automobile upon which are mounted the usual front wheels 3, these wheels being journaled to rotate upon the spindle ends of the axle and the spindle ends, contrary to the usual practice, being integral with the axle, inasmuch as the present invention contemplates turning movement of the axle in the steering of the automobile as distinguished from angular adjustment of the wheels. The numeral 4 indicates the front cross member of the chassis frame and the numeral 5 the front springs which are connected at their ends to the ends of the frame member 4 and at their intermediate portions are clamped by U-bolts 6, to a plate 7 which is of circular marginal contour and which is provided with radially oppositely located extensions 8.

This plate is supported by a frame structure including side members 9 and cross members 10, 11 and 12 and which frame structure is supported by suitable braces 13 and by other means, to be presently described, below the chassis frame. The front axle 2 is formed with a boss 14 and this boss is provided at its upper end with an integral circular head 15, the head being formed axially with an opening 16. The numeral 17 indicates a hub which is disposed above the head 15, and which is provided at its lower end with an anular circumscribing flange 18 which depends therefrom and about the periphery of the head 15, as clearly shown in Fig. 3 of the drawing. The head 15 is formed in its upper side, concentric to the opening 16, with a ball race 19, and the hub 17 is formed in its under side with a similar race 20, bearing balls 21, being arranged within these races.

The hub 17 is formed axially with an opening 22 and the numeral 23 indicates a swivel pin which is snugly received in the openings 16 and 22 and which centers the hub 17 with respect to the head 15, the head 15 being rotatable with respect to the hub 17. A key 24 serves to hold the pin 23 against rotation with respect to the boss 14 of the front axle 2 and a washer 25 and nut 26 are arranged upon the lower end of the pin, the nut being tightened so as to secure the washer in place and the said washer being of a diameter greater than that of the pin, so as to engage the under side of the boss 14, and prevent any upward displacement of the pin in the opening 16.

The hub 17 is formed at its upper end with a circular casing 27 which has an open upper side and arranged within this casing is a segmental gear 28, the toothed peripheral portion of the gear being indicated by the numeral 29. A key 30 serves to secure the gear to the upper end of the pin and the said pin is provided at its said upper end with a head 31 which seats in a recess 32 formed in the upper side of the gear. The purpose of the gear 28 will presently be made clear.

The casing 27 is provided at its top with oppositely located extensions 33, and the head or cap plate 7 is disposed upon the open upper end of the casing and the circular portion of this member closes the said end of the casing as shown in Figs. 1 and 3 of the drawings. It will be observed by reference to these figures that the U-bolts 6 are secured through the extensions 33 of the casing 27, these bolts likewise securing in place the front spring 5 which as previously stated rests upon the said member 7.

From the foregoing it will be evident that the gear 28 is rigid with respect to the axle 2 and consequently rotative adjustment of the gear 28 will effect a turning movement of the axle about the pin 23 as an axis. In order that the gear 28 may be adjusted in the manner stated, a gear 34 of the segmental type is fixed upon a shaft 35 which is journaled at its ends in bearings 36 provided upon the frame member 10 intermediate the ends of the said member, the said gear meshing with the gear 28 as shown in Fig. 4 of the drawings. A pin 37 is fixed upon the upper side of the gear 34 and a lever arm 38 is mounted for transverse rocking movement near its forward end upon a pivot pin 39 which is mounted in any suitable manner upon the frame member 11 intermediate the ends of the said frame member, and the forward end portion of the lever arm 38 is formed with a longitudinal slot 40 in which the pin 37 is engaged. At this point it will be evident that when the lever arm is swung to either side, rotary motion for a part of a revolution will be imparted to the gear 34 and this motion will be transmitted to the axle 2 so that the same will be turned in one direction or the other, depending upon the direction of rotation of the gear 34.

In order that the swinging movement of the arm 38 may be effected through the medium of a steering post which is indicated by the numeral 41 and which does not differ from the ordinary steering post of an automobile, an arm 42 is fitted at the lower end of the said post and a tie rod 43 is connected at one end by a universal joint 44 with the lower end of the said arm 42 and at its other end, by a universal joint 45, with the rear end of the lever arm 38. The column 41 will of course be provided at its upper end with the usual steering wheel and it will now be understood that by manually rotating the steering wheel in the usual manner, the axle 2 will be turned to steer the automobile.

It will be evident from the foregoing description and from an inspection of the drawings that the steering gear embodying the invention differs radically from the standard types of steering gears now in use chiefly in the respect that in the present steering gear the front axle is adjusted with a turning movement as distinguished from an angular adjustment of the front wheels. As a consequence of this departure from the standard construction, the driver of an automobile equipped with the steering mechanism embodying the invention is enabled to make an exceptionally sharp turn and therefore experiences none of the inconveniences in driving which are now experienced by the drivers of automobiles equipped with the ordinary steering mechanism. It will also be evident that no trouble will be experienced by the driver of an automobile equipped with the steering mechanism embodying this invention in backing into a very restricted parking space and likewise in leaving the same.

Having thus described the invention what I claim is:

In steering mechanism for automobiles, the combination with a front axle and steering post having a steering shaft; of a head upon the axle, a hub disposed above the head, a swivel pin carried by the axle axially of said head and fitting rotatably in the hub, the said hub being fixed with respect to the body of the automobile, the said hub further being hollow to provide a gear chamber, a gear mounted in said chamber and fixed upon said swivel pin, a lever pivoted intermediate its ends and having one end provided with a slot, a second gear meshing with the first gear and having a pin extended into said slot, a rock-arm on the lower end of the steering shaft, and a link having ball and socket connection at its opposite ends with the rock-arm and the remaining end of the lever.

In testimony whereof I affix my signature.

MONROE A. COVER.